(12) United States Patent
Chen et al.

(10) Patent No.: US 12,424,919 B2
(45) Date of Patent: Sep. 23, 2025

(54) CONTROLLER AND METHOD FOR CONTROLLING A VOLTAGE CONVERTER

(71) Applicant: Beijing Big Moment Technology Co., Ltd, Beijing (CN)

(72) Inventors: Kai Chen, Sichuan (CN); Zhiguo Liu, Sichuan (CN)

(73) Assignee: Beijing Big Moment Technology Co., Ltd., Beijing (CN)

( * ) Notice: Subject to any disclaimer, the term of this patent is extended or adjusted under 35 U.S.C. 154(b) by 250 days.

(21) Appl. No.: 18/196,382

(22) Filed: May 11, 2023

(65) Prior Publication Data

US 2023/0369955 A1  Nov. 16, 2023

(30) Foreign Application Priority Data

May 13, 2022  (CN) .......................... 202210517368.X

(51) Int. Cl.
*H02M 3/156* (2006.01)
*H02J 7/00* (2006.01)
*H02M 1/00* (2006.01)

(52) U.S. Cl.
CPC ........... *H02M 1/0003* (2021.05); *H02J 7/007* (2013.01); *H02M 3/156* (2013.01)

(58) Field of Classification Search
CPC ............ H04B 2215/069; H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 1/0006
See application file for complete search history.

(56) References Cited

U.S. PATENT DOCUMENTS

2022/0271666 A1*  8/2022  Hsu ..................... H02M 3/1582

* cited by examiner

*Primary Examiner* — Bryan R Perez

(57) ABSTRACT

A controller for controlling a voltage converter that generates a real-time charging current and a real-time charging voltage, including a compensation circuit, a driving circuit and a control circuit. The compensation circuit compares the real-time charging current with a preset charging current to generate a first comparison result, compares the real-time charging voltage with a preset battery voltage to generate a second comparison result, and generates a compensation voltage. The driving circuit generates a pulse width modulation signal based on the compensation voltage. The control circuit generates a control signal based on the pulse width modulation signal and a current indication signal. The driving circuit further generates a first switching signal based on the pulse width modulation signal to control an upper switch of the voltage converter and generates a second switching signal based on the control signal to control a lower switch of the voltage converter.

21 Claims, 9 Drawing Sheets

CONTROLLER AND METHOD FOR CONTROLLING A VOLTAGE CONVERTER

RELATED APPLICATION

This application claims priority to Chinese Patent Application No. 202210517368.X, titled "Controller and Method for Controlling a Voltage Converter," filed on May 13, 2022, with the National Intellectual Property Administration of the People's Republic of China (CNIPA).

BACKGROUND

FIG. 1 shows a conventional charging circuit 100 for charging a battery. The charging circuit 100 includes a controller 110 and a voltage converter. The voltage converter comprises an upper switch Q1, a lower switch Q2, an inductor L1 and a capacitor C1. The upper switch Q1 and the lower switch Q2 are N-type metal oxide semiconductor field effect transistors (NMOSFET). The controller 110 regulates a real-time charging current ICH and a real-time charging voltage VBATT provided to the battery by controlling the upper switch Q1 and the lower switch Q2. VDDP is a reference voltage output by the controller 110. The capacitor C2 is a bootstrap capacitor. The voltages at the two ends of the capacitor C2 are BST and LX respectively. The capacitor C2 provides a voltage for driving the upper switch Q1. Taking the charging circuit 100 operating in the continuous conduction state as an example, referring to FIG. 2, the controller 110 alternately turns on the upper switch Q1 and the lower switch Q2. Neglecting the voltage drop across the lower switch Q2 and the voltage drop across the diode D1, when the lower switch Q2 is on, the voltage of LX is 0V (i.e., ground level), the reference voltage VDDP output by the controller 100 charges the bootstrap capacitor C2 through the diode D1, and the voltage across C2 is VDDP. Neglecting the voltage drop across the upper switch Q1, when the upper switch Q1 is on, the voltage across C2 remains VDDP because the voltage across the capacitor C2 cannot change suddenly. As a result, the voltage of BST is raised to VIN+VDDP and is supplied to drive the upper switch Q1.

The operation modes of the voltage converter in FIG. 1 include a synchronous mode and an asynchronous mode. If the load current is relatively large, the voltage converter operates in the synchronous mode, and the upper switch Q1 and the lower switch Q2 are turned on alternately. If the load current is relatively small, the voltage converter operates in the asynchronous mode, and only the upper switch Q1 is periodically turned on. When Q1 is turned off, the lower switch Q2 is off, and the current flowing through the inductor L1 continues to flow through the body diode of the lower switch Q2. In the asynchronous mode, if the load is relatively light and the conduction time of the upper switch Q1 is long, the conduction time of the body diode of the lower switch Q2 is short. As a result, the bootstrap capacitor C2 does not have sufficient charging time to develop a voltage high enough to drive the upper switch Q1. A traditional solution is to detect the voltage across the bootstrap capacitor C2. If the voltage across C2 is too low, the lower switch Q2 is forced on to charge the bootstrap capacitor C2. In this traditional method, the operational frequency and turn-on time point of the lower switch Q2 are random. The random operational frequency of Q2 will produce audio noise. The random turn-on time point of Q2 will produce negative current on the inductor L1, which will result in large ripple in the output voltage and in the output current of the voltage converter.

SUMMARY

Disclosed are embodiments of a controller for controlling a voltage converter. The voltage controller generates a real-time charging current and a real-time charging voltage to charge a battery. The controller includes a compensation circuit, a driving circuit and a control circuit. The compensation circuit compares the real-time charging current with a preset charging current to generate a first comparison result, compares the real-time charging voltage with a preset battery voltage to generate a second comparison result, and generates a compensation voltage based on the first comparison result and the second comparison result. The driving circuit generates a pulse width modulation signal based on the compensation voltage. The control circuit generates a control signal based on the pulse width modulation signal and a current indication signal. The driving circuit further generates a first switching signal based on the pulse width modulation signal to control an upper switch of the voltage converter and generates a second switching signal based on the control signal to control a lower switch of the voltage converter.

In other embodiments, a controller for controlling a voltage converter is disclosed. The voltage controller generates a real-time charging current and a real-time charging voltage to charge a battery. The controller includes a first driving pin and a second driving pin. The first driving pin outputs a first switching signal to control an upper switch of the voltage converter. The second driving pin outputs a second switching signal to control a lower switch of the voltage converter. If the real-time charging current is greater than a current threshold, then the controller operates in a synchronous mode, and the second switching signal is synchronized and inverted with the first switching signal. If the real-time charging current is less than the current threshold, then the controller operates in an asynchronous mode, and the second switching signal is a narrow width pulse signal sequence whose frequency is 1/N of that of the first switching signal, wherein N is an integer greater than or equal to 2.

In other embodiments, a method for controlling a voltage converter is disclosed. The voltage controller generates a real-time charging current and a real-time charging voltage to charge a battery. The method includes: comparing the real-time charging current with a preset charging current to generate a first comparison result; comparing the real-time charging voltage with a preset battery voltage to generate a second comparison result; generating a compensation voltage based on the first comparison result and the second comparison result; generating a pulse width modulation signal based on the compensation voltage; generating a first switching signal based on the pulse width modulation signal to control an upper switch of the voltage converter; and generating a narrow width pulse signal sequence whose frequency is 1/N of that of the pulse width modulation signal as a second switching signal to control a lower switch of the voltage converter if the real-time charging current is less than a current threshold, wherein N is an integer greater than or equal to 2.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in combination with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail to avoid obscuring aspects of the present invention.

Figure 1:
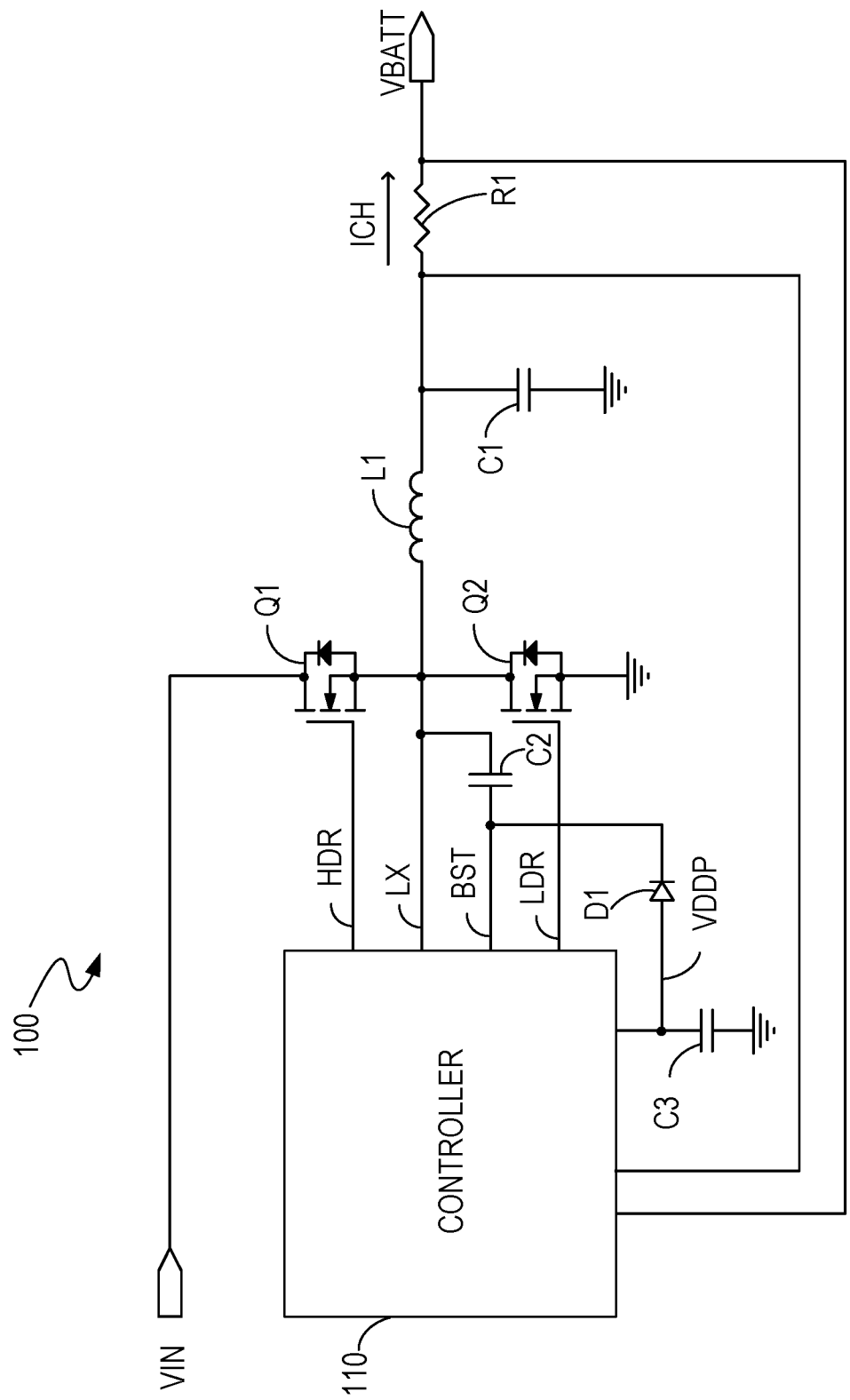
FIG. 1 shows a conventional charging circuit.
Figure 2:
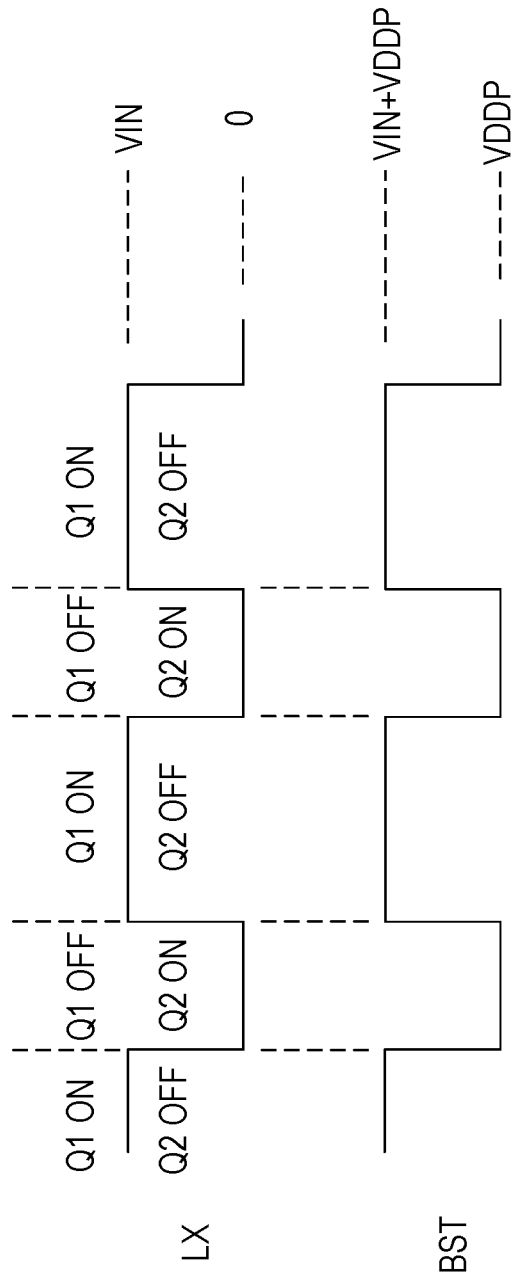
FIG. 2 shows a voltage waveform of a bootstrap capacitor in a conventional charging circuit.
Figure 3:
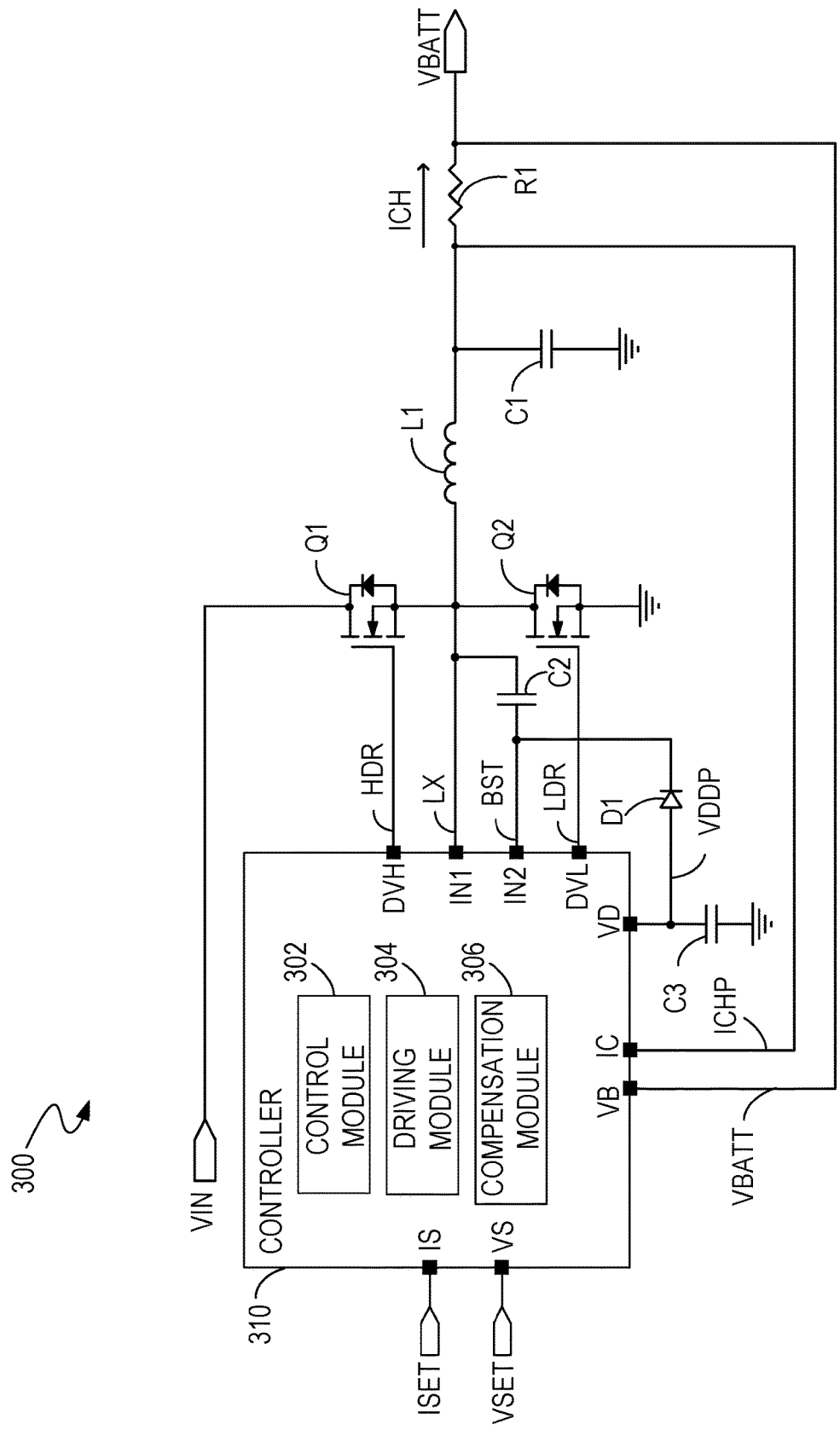
FIG. 3 shows a charging circuit, in accordance with embodiments of the present invention.

FIG. 3 shows a charging circuit 300, in accordance with embodiments of the present invention. The charging circuit 300 includes a controller 310 and a voltage converter controlled by the controller 310. In the example of FIG. 3, the voltage converter includes an upper switch Q1, a lower switch Q2, an inductor L1 and a capacitor C1. The voltage converter receives an input voltage VIN and generates a real-time charging current ICH and a real-time charging voltage VBATT to charge the battery (not shown in FIG. 3). The controller 310 regulates the real-time charging current ICH and the real-time charging voltage VBATT provided to the battery by controlling the upper switch Q1 and the lower switch Q2. The capacitor C2 is a bootstrap capacitor. The voltages at the two ends of the capacitor C2 are BST and LX respectively. The capacitor C2 provides a voltage for driving the upper switch Q1.

The pins of the controller 310 include a first driving pin DVH, a second driving pin DVL, a first input pin IN1, a second input pin IN2, a current setting pin IS, a voltage setting pin VS, a reference voltage output pin VD, and detection pins VB and IC. The first driving pin DVH is operable for outputting a first switching signal HDR to control the upper switch Q1 of the voltage converter. The second driving pin DVL is operable for outputting a second switching signal LDR to control the lower switch Q2 of the voltage converter. The first input pin IN1 and the second input pin IN2 are respectively coupled to two ends of the bootstrap capacitor C2. The current setting pin IS is operable for receiving a current setting signal ISET indicating a preset charging current. The voltage setting pin VS is operable for receiving a preset battery voltage VSET. The reference voltage output pin VD is operable for outputting a reference voltage VDDP. The detection pin VB is operable for detecting the real-time charging voltage VBATT. The detection pins VB and IC are coupled to two ends of resistor R1 respectively, and are operable for detecting the real-time charging current ICH according to the voltage ICHP and VBATT at the two ends of resistor R1.

The controller 310 includes a driving circuit 304, a compensation circuit 306 and a control circuit 302. The compensation circuit 306 is operable for comparing the real-time charging current ICH with the preset charging current to generate a first comparison result, comparing the real-time charging voltage VBATT with the preset battery voltage to generate a second comparison result, and generating the compensation voltage VCOMP based on the first comparison result and the second comparison result. The driving circuit 304 is operable for generating a pulse width modulated signal PWM based on the compensation voltage VCOMP. The control circuit 302 is operable for generating the control signal LDR2 based on the pulse width modulation signal PWM and a current indication signal IBATT indicating the real-time charging current ICH. The driving circuit 304 generates the first switching signal HDR based on the pulse width modulation signal PWM to control the upper switch Q1 of the voltage converter, and generates the second switching signal LDR based on the control signal LDR2 to control the lower switch Q2 of the voltage converter.

Figure 4:
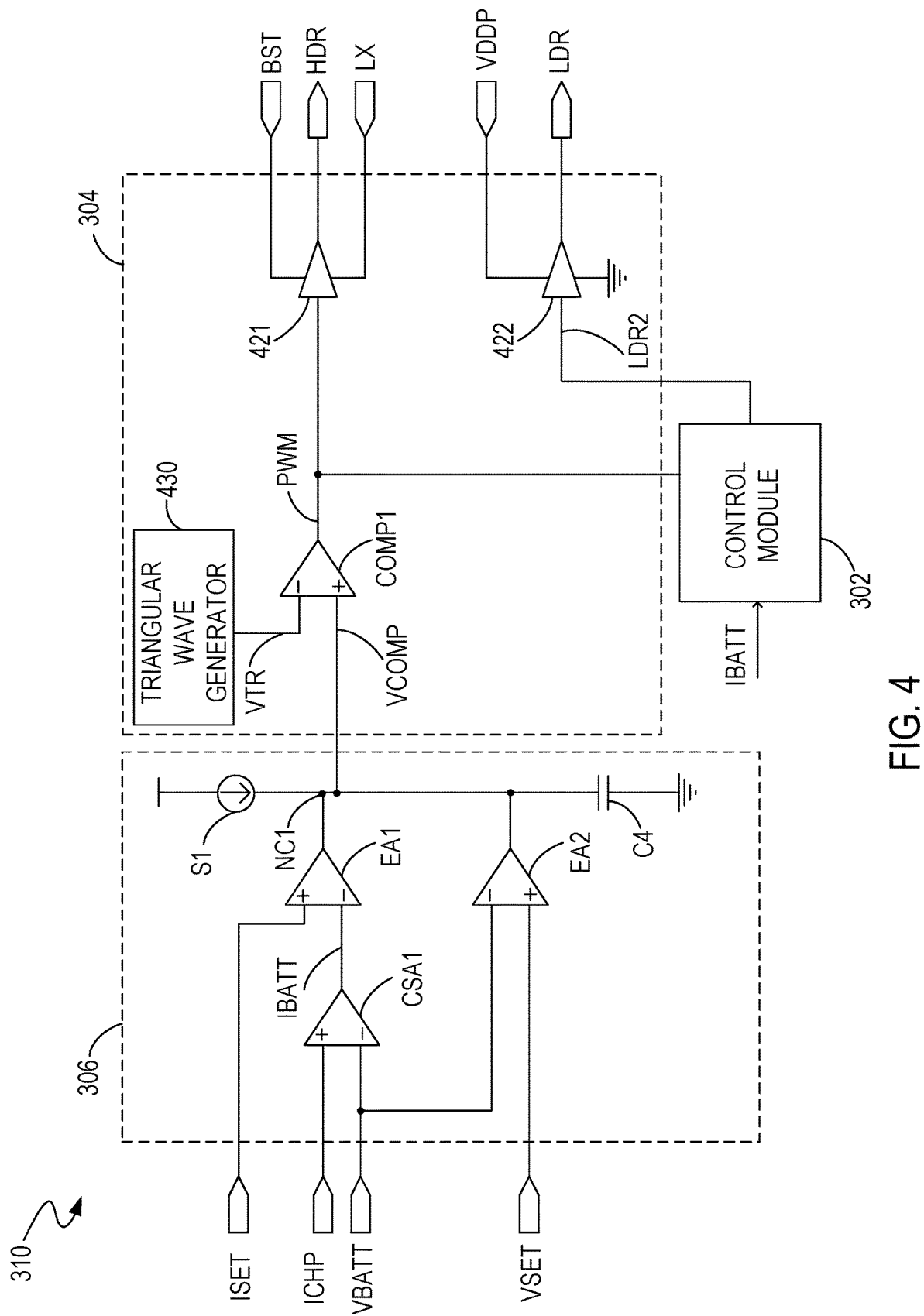
FIG. 4 shows a circuit diagram of a controller, in accordance with embodiments of the present invention.

FIG. 4 shows a circuit diagram of the controller 310, in accordance with embodiments of the present invention. The controller 310 includes a driving circuit 304, a compensation circuit 306, and a control circuit 302.

The compensation circuit 306 includes a first operational amplifier EA1, a second operational amplifier EA2 and a third operational amplifier CSA1. The third operational amplifier CSA1 compares the voltage signals ICHP and VBATT and generates the current indication signal IBATT indicating the real-time charging current ICH. The first operational amplifier EA1 compares the real-time charging current ICH with the preset charging current by comparing the current indication signal IBATT and the current setting signal ISET, and generates the first comparison result. The second operational amplifier EA2 compares the real-time charging voltage VBATT with the preset battery voltage VSET and generates the second comparison result. The compensation circuit 306 further includes a current source S1 for charging the capacitor C4. The voltage across the capacitor C4 is the compensation voltage VCOMP, which is adjusted by the first and second comparison results. Specifically, if the real-time charging current ICH is less than the preset charging current, then the output of the first operational amplifier EA1 increases, the current supplied by the current source S1 charges the capacitor C4, and the compensation voltage VCOMP increases. If the real-time charging current ICH is greater than the preset charging current, then the output of the first operational amplifier EA1 decreases, the first operational amplifier EA1 absorbs the current provided by the current source S1, and the compensation voltage VCOMP decreases. If the real-time charging voltage VBATT is less than the preset battery voltage VSET, then the output of the second operational amplifier EA2 increases, the current supplied by the current source S1 charges the capacitor C4, and the compensation voltage VCOMP increases. If the real-time charging voltage VBATT is greater than the preset battery voltage VSET, then the output of the second operational amplifier EA2 decreases, the second operational amplifier EA2 absorbs the current provided by the current source S1, and the compensation voltage VCOMP decreases.

The driving circuit 304 includes a triangular wave generator 430, a first comparator COMP1, a first driver 421, and a second driver 422. The triangle wave generator 430 is operable for generating a triangle wave signal VTR. The first comparator COMP1 generates a pulse width modulated signal PWM based on the triangle wave signal VTR and the compensation voltage VCOMP. The first driver 421 is operable for generating the first switching signal HDR based on the pulse width modulation signal PWM. The second driver 422 is operable for generating the second switching signal LDR based on the control signal LDR2. As shown in FIG. 4, a first input terminal of the first comparator COMP1 receives the compensation voltage VCOMP, a second input terminal of the first comparator COMP1 receives the triangle wave signal VTR, and the output terminal of the first comparator COMP1 outputs the pulse width modulation signal PWM. The first input terminal of the first comparator COMP1, the output terminal of the first operational amplifier EA1, the output terminal of the second operational amplifier EA2, the current source S1 and the capacitor C4 are connected to a common node NC1.

Figure 5:
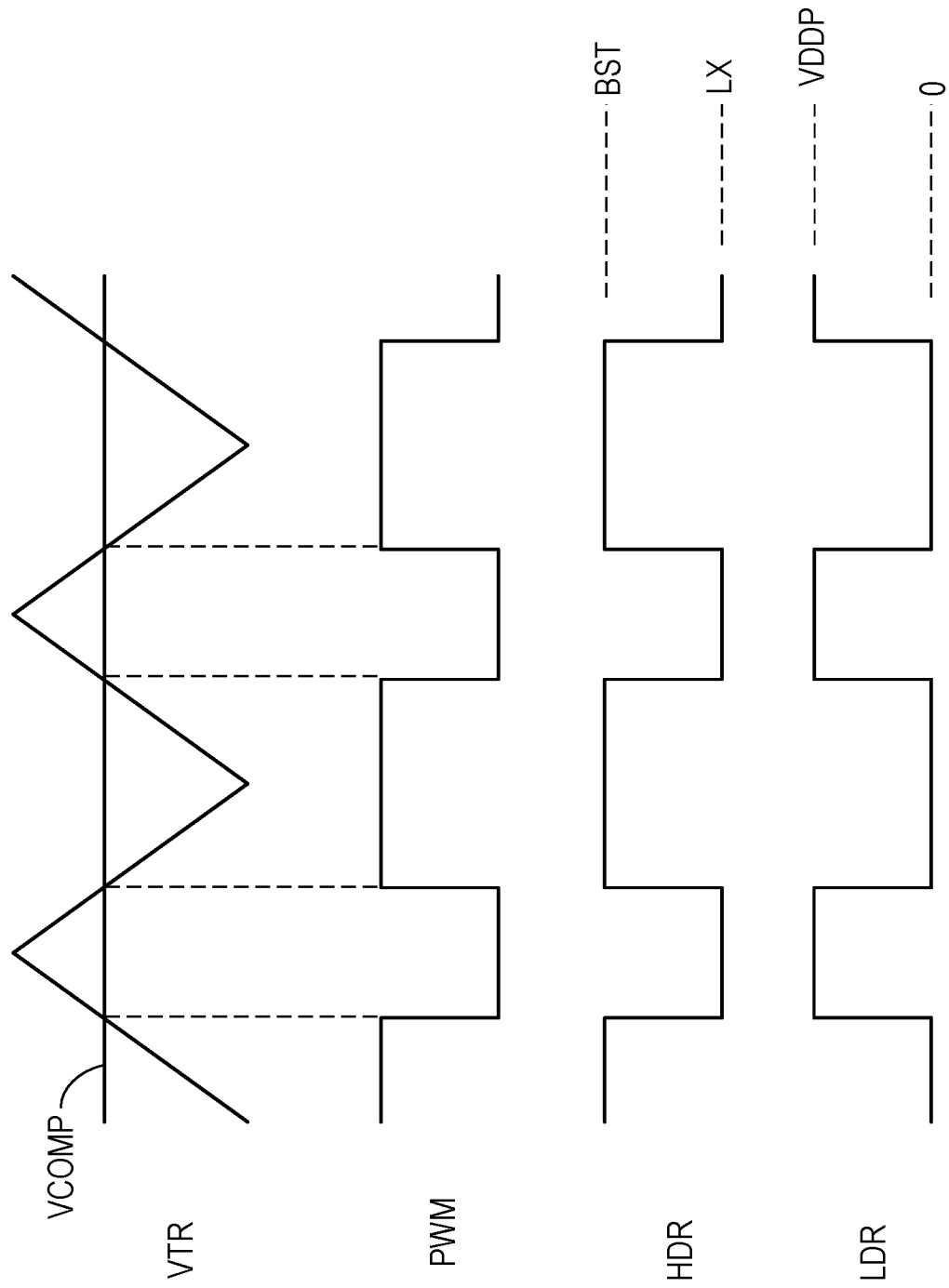
FIG. 5 shows signal waveforms of a driving circuit in a controller, in accordance with embodiments of the present invention.

As shown in FIG. 5, if the compensation voltage VCOMP is greater than the triangle wave signal VTR, the pulse width modulation signal PWM is logic high. If the compensation voltage VCOMP is less than the triangle wave signal VTR, the pulse width modulation signal PWM is logic low. The first switching signal HDR is generated by the first driver 421 based on the pulse width modulation signal PWM and has a waveform that is synchronized with the pulse width modulation signal PWM. HDR's high level and low level are configured to be voltage levels of BST and LX respectively by the first driver 421. The second switching signal LDR is generated by the second driver 422 based on the control signal LDR2 had has a waveform that is synchronized with the control signal LDR2. LDR's high level and low level are configured to be voltage levels of VDDP and OV (i.e., ground level) respectively by the second driver 422.

Figure 6:
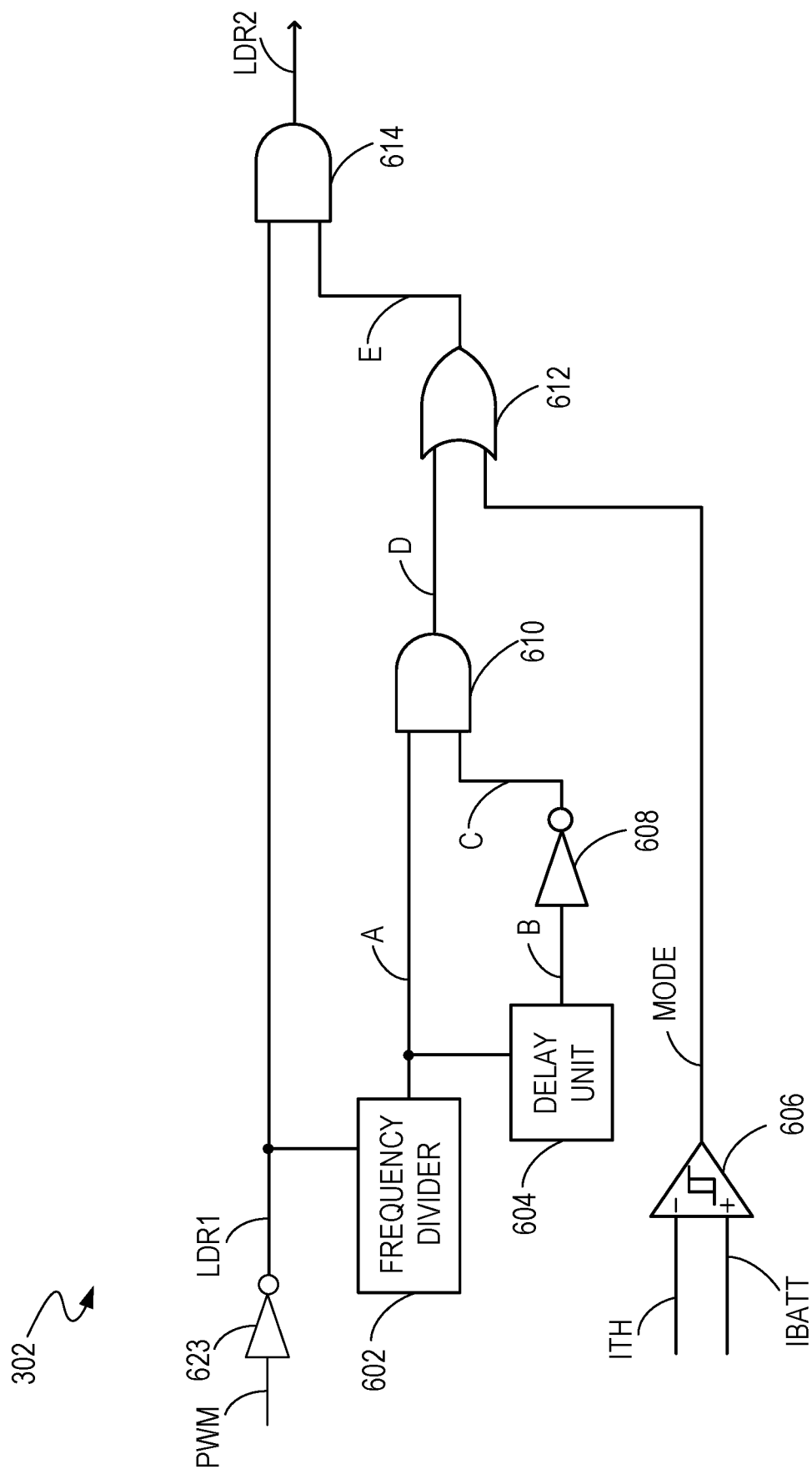
FIG. 6 shows a circuit diagram of a control circuit in a controller, in accordance with embodiments of the present invention.

FIG. 6 shows a circuit diagram of the control circuit 302 in the controller 310, in accordance with embodiments of the present invention. The control circuit 302 includes a first inverter 623, a frequency divider 602, a delay unit 604, a second inverter 608, a first AND gate 610, a OR gate 612, a second AND gate 614, and a second comparator 606.

The second comparator 606 is operable for comparing the current indication signal IBATT indicating the real-time charging current ICH with a threshold signal ITH indicating a current threshold. If the current indication signal IBATT is greater than the threshold signal ITH (that is, the real-time charging current ICH is greater than the current threshold), then the controller 310 operates in the synchronous mode, and the control signal LDR2 generated by the control circuit 302 is synchronized and inverted with the pulse width modulation signal PWM. If the current indication signal IBATT is less than the threshold signal ITH (that is, the real-time charging current ICH is less than the current threshold), then the controller 310 operates in the asynchronous mode, and the control circuit 302 generates a narrow width pulse signal every N (N is an integer greater than or equal to 2) cycle of the pulse width modulation signal PWM. The sequence composed of multiple narrow width pulse signals is the control signal LDR2. In other words, in the asynchronous mode, the control signal LDR2 generated by the control circuit 302 is a narrow width pulse signal sequence, and its frequency is 1/N of the frequency of the pulse width modulation signal PWM. Because the waveform of the first switching signal HDR is synchronized with the pulse width modulation signal PWM, the frequency of the control signal LDR2 in the asynchronous mode is also 1/N of the frequency of the first switching signal HDR.

Figure 7:
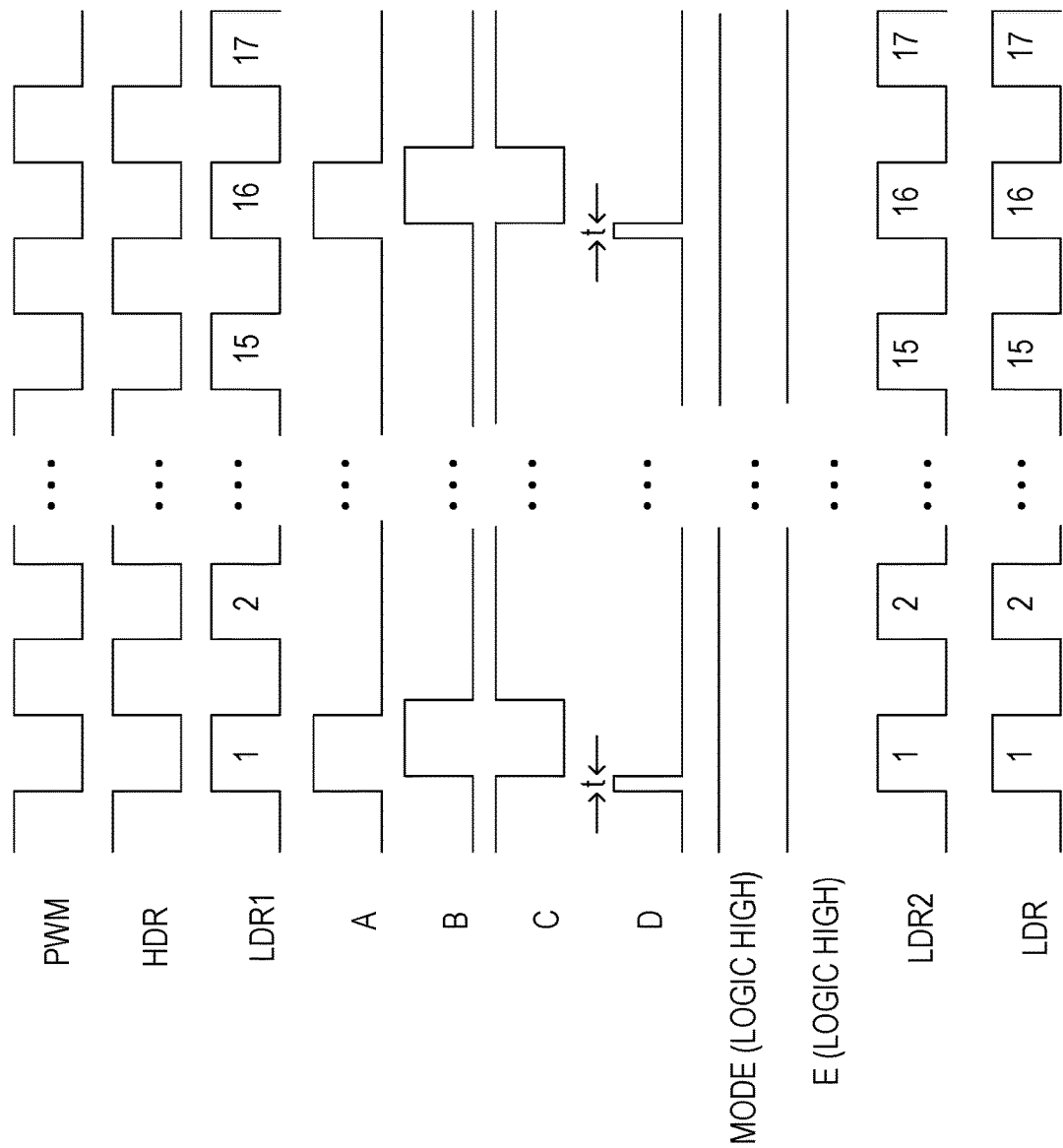
FIG. 7 shows a timing diagram of a controller operating in a synchronous mode, in accordance with embodiments of the present invention.
Figure 8:
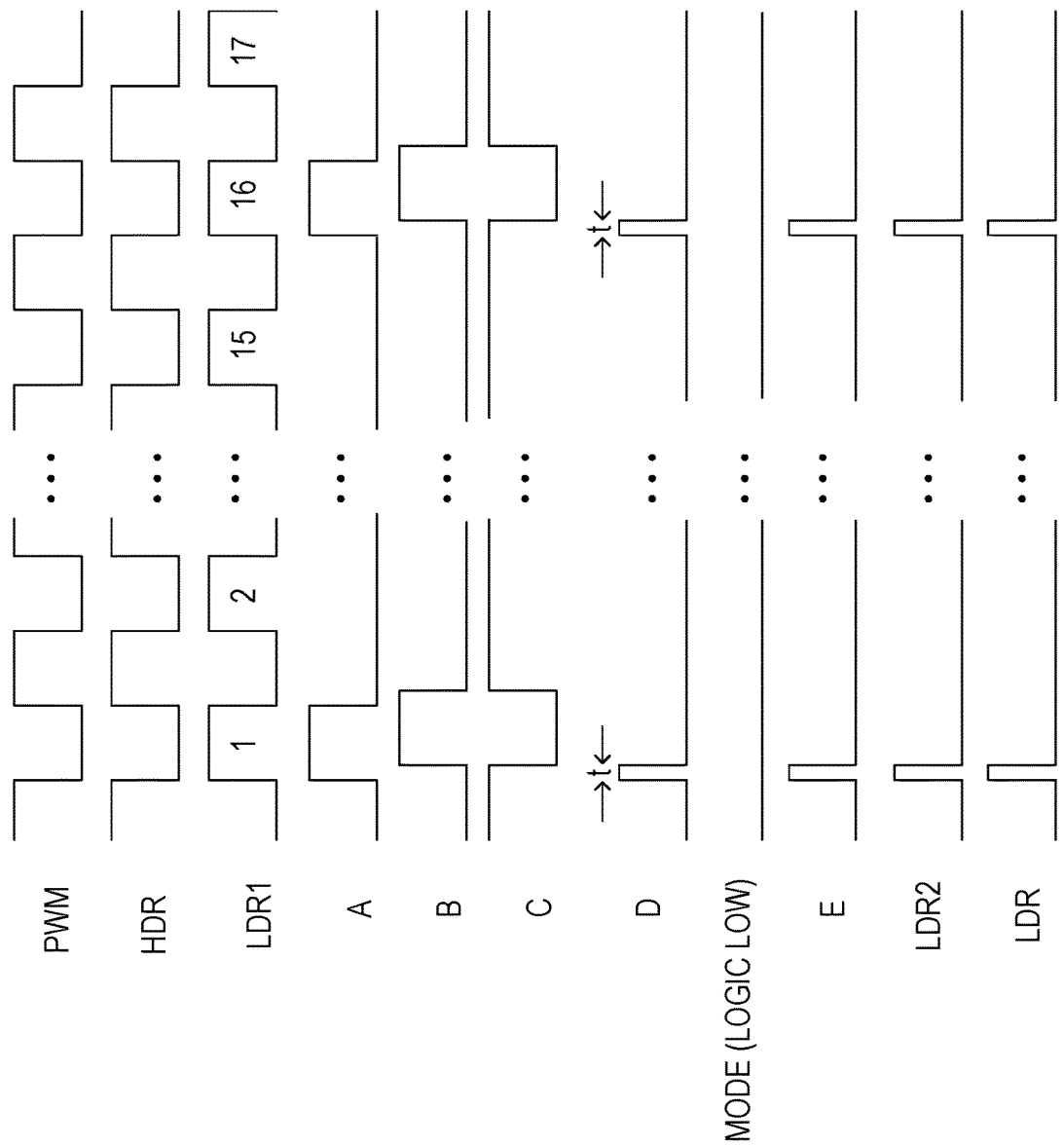
FIG. 8 shows a timing diagram of a controller operating in an asynchronous mode, in accordance with embodiments of the present invention.

FIG. 7 shows a timing diagram of the controller 310 operating in the synchronous mode, in accordance with embodiments of the present invention. FIG. 8 shows a timing diagram of the controller 310 operating in the asynchronous mode, in accordance with embodiments of the present invention. The operation of the control circuit 302 will be described in combination with FIGS. 6, 7 and 8.

Refer to FIGS. 6 and 7. If the current indication signal IBATT is greater than the threshold signal ITH, then a mode signal MODE output by the second comparator 606 is high, and the controller 310 operates in the synchronous mode. The first inverter 623 generates an inverted pulse width modulated signal LDR1 based on the pulse width modulated signal PWM. The frequency divider 602 generates a frequency division signal A based on the inverted pulse width modulation signal LDR1. Specifically, the frequency divider 602 divides the frequency of LDR1 to generate a frequency division signal A whose frequency is 1/N of that of the pulse width modulation signal PWM, where N is an integer greater than or equal to 2. In the examples of FIGS. 7 and 8, the parameter N for frequency division is 16. In one embodiment, the frequency of frequency division signal A obtained through frequency division is configured to be greater than the upper limit 20 KHz of human hearing frequency, so the circuit will not generate audible noise. The delay unit 604 delays the frequency division signal A to generate a delay signal B. In one embodiment, the delay time t of the delay unit 604 is set between 70 ns and 120 ns. The second inverter 608 generates an inversed delay signal C based on the delay signal B. The first AND gate 610 performs AND operation on the frequency division signal A and the inversed delay signal C and generates the output signal D. The OR gate 612 performs OR operation on the output of the first AND gate 610 and the output of the second comparator 606 and generates an output signal E. The second AND gate 614 performs AND operation on the output of the OR gate 612 and the inverted pulse width modulation signal LDR1 to generate the control signal LDR2. In the synchronous mode, the mode signal MODE is high, so the output E of the OR gate 612 is high. LDR2 output from the second AND gate 614 is the same as LDR1, which is the inversed version of the pulse width modulation signal PWM. The second driver 422 generates the second switching signal LDR based on the control signal LDR2. The second switching signal LDR is synchronized with the control signal LDR2.

Refer to FIGS. 6 and 8. If the current indication signal IBATT is less than the threshold signal ITH, then the mode signal MODE output by the second comparator 606 is low and the controller 310 operates in the asynchronous mode. The output signal E of OR gate 612 is determined by the output signal D of the first AND gate 610. The waveforms of signal E and signal D are same, and the frequency of both are equal to the frequency of the frequency division signal A. The generation of signal D in the asynchronous mode is similar to that in synchronous mode. The second AND gate 614 performs AND operation on the output signal E of OR gate 612 and the inverted pulse width modulation signal LDR1 to generate the control signal LDR2. Therefore, the frequency of control signal LDR2 is equal to the frequency of the frequency division signal A. The waveform of LDR2 is the same as that of signal D and signal E, which is a sequence composed of multiple narrow width pulse signals having a pulse width equal to t. The rising edge of each narrow width pulse signal is aligned with the falling edge of the pulse width modulation signal PWM, and is also aligned with the falling edge of the first switching signal HDR. The second driver 422 generates the second switching signal LDR based on the control signal LDR2. The second switching signal LDR is synchronized with the control signal LDR2. In one embodiment, the frequency of frequency division signal A obtained through the frequency division is configured to be greater than the upper limit 20 KHz of human ear hearing frequency, so that the frequency of the control signal LDR2 is also greater than 20 KHz. Referring to FIG. 3, the lower switch Q2 of the voltage converter is forced to turn on during the time period t during which each narrow width pulse signal is high, and the bootstrap capacitor C2 is charged during this time period to develop a voltage sufficient to drive the upper switch Q1. Using the circuit and control method disclosed in the present invention, the frequency of the lower switch Q2 is beyond the upper limit of human ear hearing range, so no audio noise will be generated. Furthermore, the turn-on time point of the lower switch Q2 is set at the falling edge of the pulse width modulation signal PWM, that is, the turn-off time point of the upper switch Q1. Accordingly, the disadvantages of the traditional method, that is, the lower switch Q1 is randomly turned on to produce negative current on the inductor which leads to large ripple in output voltage and output current, can be avoided.

Figure 9:
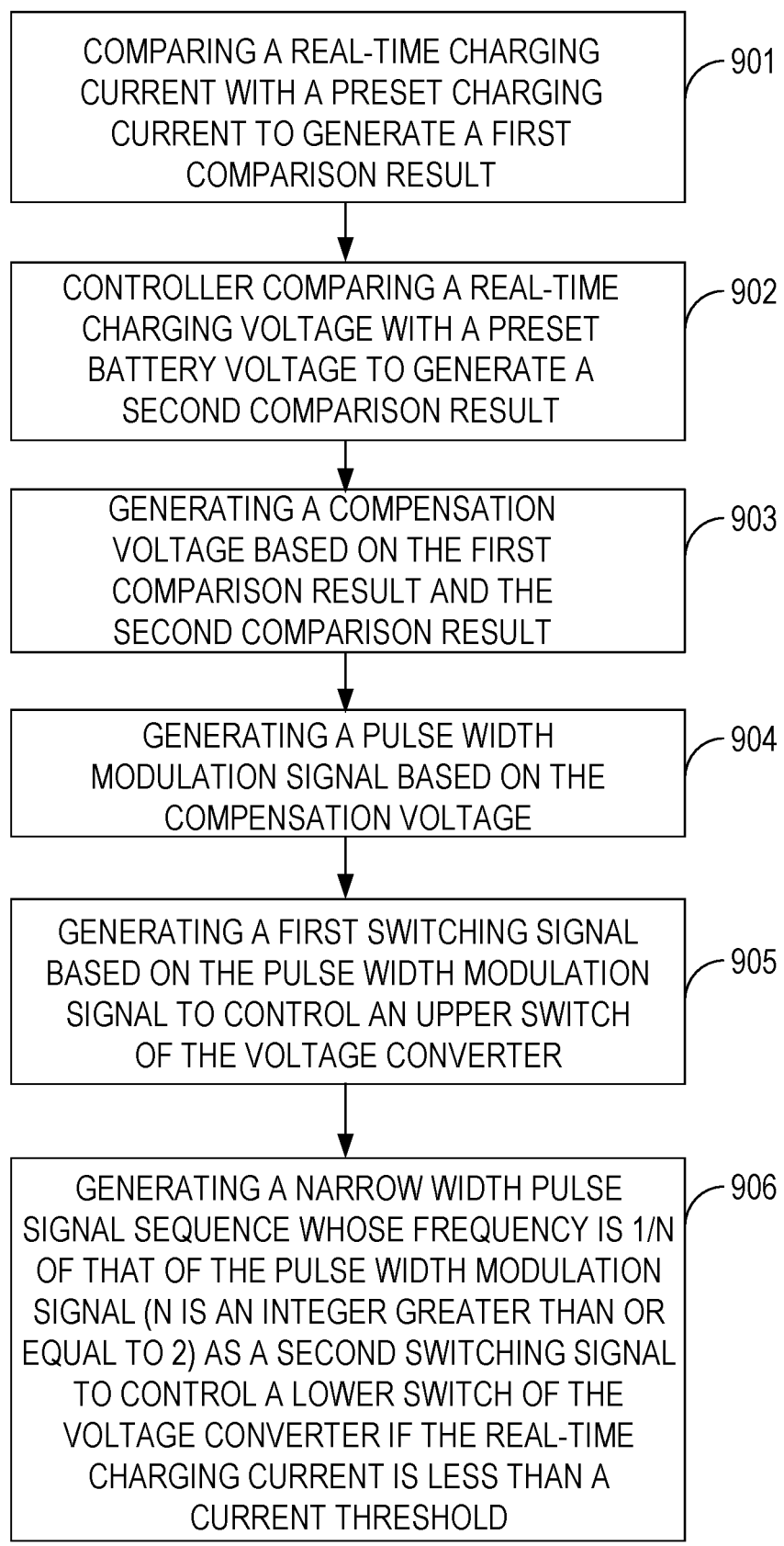
FIG. 9 shows a flowchart of a method for controlling a voltage converter, in accordance with embodiments of the present invention.

FIG. 9 shows a flowchart of a method for controlling a voltage converter, in accordance with embodiments of the present invention.

In block 901, a controller compares a real-time charging current with a preset charging current to generate a first comparison result.

In block 902, the controller compares a real-time charging voltage with a preset battery voltage to generate a second comparison result.

In block 903, the controller generates a compensation voltage based on the first comparison result and the second comparison result.

In block 904, the controller generates a pulse width modulation signal based on the compensation voltage.

In block 905, the controller generates a first switching signal based on the pulse width modulation signal to control an upper switch of the voltage converter.

In block 906, if the real-time charging current is less than a current threshold, the controller generates a narrow width pulse signal sequence whose frequency is 1/N of that of the pulse width modulation signal (N is an integer greater than or equal to 2) as a second switching signal to control a lower switch of the voltage converter.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller for controlling a voltage converter, said voltage converter receiving an input voltage and generating a real-time charging current and a real-time charging voltage to charge a battery, wherein said the controller comprises:
 a compensation circuit operable for generating a compensation voltage, wherein said compensation circuit comprises:
  a first operational amplifier operable for comparing said real-time charging current with a preset charging current to generate a first comparison result;
  a second operational amplifier operable for comparing said real-time charging voltage with a preset battery voltage to generate a second comparison result; and
  a current source operable for charging a capacitor, wherein a voltage across said capacitor comprises said compensation voltage, and wherein said compensation voltage is adjusted by said first comparison result and said second comparison result;
 a driving circuit, coupled to said compensation circuit, operable for generating a pulse width modulation signal based on said compensation voltage; and
 a control circuit, coupled to said driving circuit, operable for generating a control signal based on said pulse width modulation signal and a current indication signal indicating said real-time charging current,
 wherein said driving circuit is further operable for generating a first switching signal based on said pulse width modulation signal to control an upper switch of said voltage converter, and generating a second switching signal based on said control signal to control a lower switch of said voltage converter.

2. The controller of claim 1, wherein said driving circuit comprises:
 a triangular wave generator operable for generating a triangular wave signal;
 a first comparator operable for generating said pulse width modulated signal based on said triangular wave signal and said compensation voltage;
 a first driver operable for generating said first switching signal based on said pulse width modulation signal; and
 a second driver operable for generating said second switching signal based on said control signal.

3. The controller of claim 2, wherein a first input terminal of said first comparator receives said compensation voltage, a second input terminal of said first comparator receives said triangular wave signal, and an output terminal of said first comparator outputs said pulse width modulation signal, and wherein said first input terminal of said first comparator, an output terminal of said first operational amplifier, an output terminal of said second operational amplifier, said current source and said capacitor are connected to a common node.

4. The controller of claim 2, wherein said control circuit comprises:
 a second comparator operable for comparing said current indication signal with a threshold signal indicating a current threshold, wherein: if said current indication signal is greater than said threshold signal, then said controller operates in a synchronous mode, wherein in said synchronous mode, said control signal generated by said control circuit is synchronized and inverted with said pulse width modulation signal; if said current indication signal is less than said threshold signal, then said controller operates in an asynchronous mode, wherein in said asynchronous mode, said control signal generated by said control circuit comprises a narrow width pulse signal sequence whose frequency is 1/N of that of said pulse width modulation signal, and wherein N is an integer greater than or equal to 2.

5. The controller of claim 4, wherein a rising edge of each narrow width pulse signal in said narrow width pulse signal sequence is aligned with a falling edge of said first switching signal.

6. The controller of claim 4, wherein a frequency of said control signal is greater than 20 KHz.

7. The controller of claim 4, wherein said control circuit further comprises:
a first inverter operable for generating an inverted pulse width modulated signal based on said pulse width modulated signal;
a frequency divider operable for generating a frequency division signal based on said inverted pulse width modulated signal, wherein a frequency of said frequency division signal is 1/N of that of said pulse width modulated signal;
a delay unit operable for delaying said frequency division signal to generate a delay signal;
a second inverter operable for generating an inversed delay signal based on said delay signal;
a first AND gate operable for performing AND operation on said frequency division signal and said inversed delay signal;
an OR gate operable for performing OR operation on an output of said first AND gate and an output of said second comparator; and
a second AND gate operable for performing AND operation on an output of said OR gate and said inverted pulse width modulation signal to generate said control signal.

8. The controller of claim 7, wherein a frequency of said frequency division signal is greater than 20 KHz.

9. The controller of claim 7, wherein a delay time of said delay unit 604 is set between 70 ns and 120 ns.

10. A controller for controlling a voltage converter, said voltage converter receiving an input voltage and generating a real-time charging current and a real-time charging voltage to charge a battery, wherein said controller comprises:
a first driving pin operable for outputting a first switching signal to control an upper switch of said voltage converter; and
a second driving pin operable for outputting a second switching signal to control a lower switch of said voltage converter,
wherein: if said real-time charging current is greater than a current threshold, then said controller operates in a synchronous mode, wherein in said synchronous mode, said second switching signal is synchronized and inverted with said first switching signal; if said real-time charging current is less than said current threshold, then said controller operates in an asynchronous mode, wherein in said asynchronous mode, said second switching signal comprises a narrow width pulse signal sequence whose frequency is 1/N of that of said first switching signal, wherein N is an integer greater than or equal to 2.

11. The controller of claim 10, wherein a rising edge of each narrow width pulse signal in said second switching signal is aligned with a falling edge of said first switching signal.

12. The controller of claim 10, wherein a frequency of said second switching signal is greater than 20 KHz.

13. The controller of claim 10, further comprising:
a first input pin coupled to one end of a bootstrap capacitor;
a second input pin coupled to another end of said bootstrap capacitor,
wherein said bootstrap capacitor is operable for providing a voltage for driving said upper switch.

14. The controller of claim 10, further comprising:
a current setting pin operable for receiving a current setting signal indicating a preset charging current; and
a voltage setting pin operable for receiving a preset battery voltage.

15. The controller of claim 14, further comprising:
a compensation circuit operable for comparing said real-time charging current with said preset charging current to generate a first comparison result, comparing said real-time charging voltage with said preset battery voltage to generate a second comparison result, and generating a compensation voltage based on said first comparison result and said second comparison result;
a driving circuit operable for generating a pulse width modulation signal based on said compensation voltage; and
a control circuit operable for generating a control signal based on said pulse width modulation signal and a current indication signal indicating said real-time charging current,
wherein said driving circuit is operable for generating said first switching signal based on said pulse width modulation signal and generating said second switching signal based on said control signal.

16. The controller of claim 15, wherein said compensation circuit comprises:
a first operational amplifier operable for comparing said real-time charging current with said preset charging current to generate said first comparison result;
a second operational amplifier operable for comparing said real-time charging voltage with said preset battery voltage to generate said second comparison result; and
a current source operable for charging a capacitor,
wherein a voltage across said capacitor comprises said compensation voltage, and wherein said compensation voltage is adjusted by said first comparison result and said second comparison result.

17. The controller of claim 16, wherein said driving circuit comprises:
a triangular wave generator operable for generating a triangular wave signal;
a first comparator operable for generating said pulse width modulated signal based on said triangular wave signal and said compensation voltage;
a first driver operable for generating said first switching signal based on said pulse width modulation signal; and
a second driver operable for generating said second switching signal based on said control signal.

18. The controller of claim 15, wherein control circuit comprises:

a second comparator operable for comparing said current indication signal indicating said real-time charging current with a threshold signal indicating said current threshold;

a first inverter operable for generating an inverted pulse width modulated signal based on said pulse width modulated signal;

a frequency divider operable for generating a frequency division signal based on said inverted pulse width modulated signal, wherein a frequency of said frequency division signal is 1/N of that of said pulse width modulated signal;

a delay unit operable for delaying said frequency division signal to generate a delay signal;

a second inverter operable for generating an inversed delay signal based on said delay signal;

a first AND gate operable for performing AND operation on said frequency division signal and said inversed delay signal;

an OR gate operable for performing OR operation on an output of said first AND gate and an output of said second comparator; and a second AND gate operable for performing AND operation on an output of said OR gate and said inverted pulse width modulation signal to generate said control signal.

19. A method for controlling a voltage converter, said voltage converter receiving an input voltage and generating a real-time charging current and a real-time charging voltage to charge a battery, wherein said method comprises:

comparing said real-time charging current with a preset charging current to generate a first comparison result;

comparing said real-time charging voltage with a preset battery voltage to generate a second comparison result;

generating a compensation voltage based on said first comparison result and said second comparison result;

generating a pulse width modulation signal based on said compensation voltage;

generating a first switching signal based on said pulse width modulation signal to control an upper switch of said voltage converter; and generating a narrow width pulse signal sequence whose frequency is 1/N of that of said pulse width modulation signal as a second switching signal to control a lower switch of said voltage converter if said real-time charging current is less than a current threshold, wherein N is an integer greater than or equal to 2.

20. The method of claim 19, wherein a rising edge of each narrow width pulse signal in said narrow width pulse signal sequence is aligned with a falling edge of said first switching signal.

21. The method of claim 19, further comprising generating a second switching signal synchronized and inverted with said pulse width modulation signal to control said lower switch of said voltage converter if said real-time charging current is greater than said current threshold.

* * * * *